US008806698B2

(12) United States Patent
Enders et al.

(10) Patent No.: US 8,806,698 B2
(45) Date of Patent: Aug. 19, 2014

(54) GRILL BRUSH SPLATTER GUARD (71) Applicants: Shaun Enders, San Diego, CA (US);
Genia Enders, San Diego, CA (US)

(72) Inventors: Shaun Enders, San Diego, CA (US);
Genia Enders, San Diego, CA (US)

(*) Notice: Subject to any disclaimer, the term of this patent is extended or adjusted under 35 U.S.C. 154(b) by 9 days.

(21) Appl. No.: 13/665,691

(22) Filed: Oct. 31, 2012

(65) Prior Publication Data
US 2014/0115806 A1    May 1, 2014

(51) Int. Cl.
*A46B 17/00* (2006.01)
*A47J 37/07* (2006.01)

(52) U.S. Cl.
CPC .................... *A47J 37/0786* (2013.01)
USPC .......................... 15/248.1; 15/111

(58) Field of Classification Search
CPC ........................................ A46B 17/00
USPC ................ 15/111, 248.1; D4/113, 116
See application file for complete search history.

(56) References Cited

U.S. PATENT DOCUMENTS

| 711,777 | A |   | 10/1902 | Marqua |   |
|---|---|---|---|---|---|
| 2,807,816 | A | * | 10/1957 | O'Brien | 401/15 |
| 2,820,237 | A | * | 1/1958 | Maslaney | 15/248.1 |
| 3,049,741 | A | * | 8/1962 | Bessette et al. | 15/248.1 |
| 3,197,795 | A | * | 8/1965 | Forte | 15/160 |
| D221,506 | S | * | 8/1971 | O'Neil | D4/116 |
| 4,285,087 | A | * | 8/1981 | Sapronetti | 15/159.1 |
| 4,516,870 | A |   | 5/1985 | Nakazato |   |
| D307,077 | S |   | 4/1990 | Bryantb |   |
| 5,373,600 | A |   | 12/1994 | Stojanovski et al. |   |
| D358,491 | S |   | 5/1995 | Hoagland |   |
| D394,328 | S |   | 5/1998 | Palumbo |   |
| D421,340 | S |   | 3/2000 | Whitaker |   |
| D422,149 | S |   | 4/2000 | Whitaker |   |
| D422,792 | S |   | 4/2000 | Liu |   |
| 6,061,862 | A |   | 5/2000 | Whitaker |   |
| D429,889 | S |   | 8/2000 | Fielding |   |
| 6,125,493 | A |   | 10/2000 | Daw |   |
| D530,098 | S |   | 10/2006 | Neal et al. |   |
| 7,168,124 | B2 |   | 1/2007 | Dalias |   |
| D546,066 | S |   | 7/2007 | Rothman et al. |   |
| D567,510 | S |   | 4/2008 | Tuli |   |
| 7,861,357 | B1 |   | 1/2011 | Porter |   |
| D641,555 | S |   | 7/2011 | Schochet |   |
| D653,037 | S |   | 1/2012 | Enders et al. |   |
| 8,209,812 | B1 |   | 7/2012 | Dondurur et al. |   |
| 2005/0011029 | A1 |   | 1/2005 | Yu |   |

* cited by examiner

*Primary Examiner* — Randall Chin
(74) *Attorney, Agent, or Firm* — Lewis Kohn & Fitzwilliam LLP; Timothy W. Fitzwilliam (57) ABSTRACT An improved splatter guard for a (e.g. barbeque) grill brush is disclosed. The present solution provides advantages and design features absent heretofore to include a solution that is able to be configured to existing brushes. Additional improvement features are that the solution provides a better range of splatter protection and a handle is provided for the guard main portion (separate from a brush handle). An opaque configuration is additionally provided as an improvement over a transparent design as well as other enhancements detailed and disclosed herein.

13 Claims, 8 Drawing Sheets

GRILL BRUSH SPLATTER GUARD

BACKGROUND OF THE INVENTION

1. Field of the Invention

The present invention pertains generally to cleaning brushes and scrapers for culinary applications. More particularly in a preferred embodiment, the invention relates to a barbecue (BBQ) grill scraper and brush with splatter guard protection.

2. Description of the Prior Art

Hand-held cleaning brushes and scrapers for removing charred residue from a grated or barred cooking surface have been known in the art. One such example was proposed by Daw and was awarded patent protection in 2000, and entitled "Combination Barbecue Grill Brush And Mitt," U.S. Pat. No. 6,125,493. This solution provides a typical brush and scraper and further aims to protect a users hand from a potentially hot grill. For this reason a heat resistant mitt is configured to a handle of the brush/scraper.

One issue that is not addressed by Daw is that of containing splatter that has tendency to direct backward toward a grill user and may permanently stain clothes. Rothman on the other hand, U.S. Des. Pat. No. D546,066, presumably includes a feature addressing this concern. However this solution (Rothman) is applicable for a rotary grill brush and a solution applicable to a planar grill brush would be configured entirely differently. Notably, some grill brush manufacturers and users may not prefer the Rothman solution since it would be more expensive and have more moving parts than a comparable planar brush.

Present inventors have also previously addressed the splatter problem in a planar barbecue brush with U.S. Des. Pat. No. D653,037. Nonetheless, the present solution provides at least the following advantages of the prior art: the solution is able to be configured to existing brushes; the solution provides better range of splatter protection; a handle is provided for the guard portion (separate from a brush handle); an opaque configuration is provided as an improvement over a transparent design; and additional features as detailed and disclosed herein.

BRIEF SUMMARY OF THE INVENTION

The present invention specifically addresses and alleviates the above mentioned deficiencies associated with the prior art. More particularly, the present invention, in a first aspect comprises an improved splatter guard configured to be coupled to a grill brush, for example a barbeque grill brush but not limited thereto. In this aspect, the grill brush has a brush portion, a handle portion and a scraper portion, the splatter guard comprising: a main cover portion having a forward and a rear end, the rear end having a raised hood forming an opening, the opening for passing the handle portion therethrough; and a raised tab for grasping and positioning the improved splatter guard.

The improved splatter guard configured to be coupled to a barbeque grill brush herein is additionally characterized wherein the main cover portion further comprises a hollow shape further being a frustum of a pyramid for covering the brush portion. The improved splatter guard of the present invention is additionally characterized wherein the raised hood further comprises a riser portion that is triangular in shape and provides an angle to the handle portion substantially equal an angle of the handle portion as coupled to the brush portion. Also, the hood has a raised hood main portion at said angle to the handle portion. Also the raised hood portion is provided a trapezoidal in shape as to ergonomically fit the brush handle portion.

As stated, the present invention is configured to be coupled to a barbeque grill brush; or alternatively the brush and spatter guard are configured permanently together. The tab portion herein is additionally characterized as comprising a pie wedged shape affixed to both the splatter guard main portion and the raised hood main portion; and an angle substantially equal to said angle to the handle portion. Alternatively, it is more correct to say that the pie wedge has an angle 180 degree minus the handle angle, because this "angle" is more clearly visible.

The improved splatter guard herein further comprises a slot at the main portion forward end to receive a scraper. The improved splatter guard configured to be coupled to a barbeque grill herein is additionally characterized wherein the rear end has a riser portion forming the opening further comprising a rear guard providing splatter protection in a reverse cleaning direction while continuing to allow the brush handle portion therethrough.

Still further, the splatter guard configured to be coupled to a barbeque grill brush in this aspect has a hinge to allow the rear guard to open for removal and passage of the brush handle portion. Also in this aspect, the rear guard has a plastic living hinge to allow the rear guard to open for removal and passage of the brush handle portion. As an alternative to having a door embodiment comprising a living hinge, first and second flaps are instead provided for securing to an inside of the rear main portion. The flaps further have a tab for assisting removal and passage of the brush handle portion.

The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1:
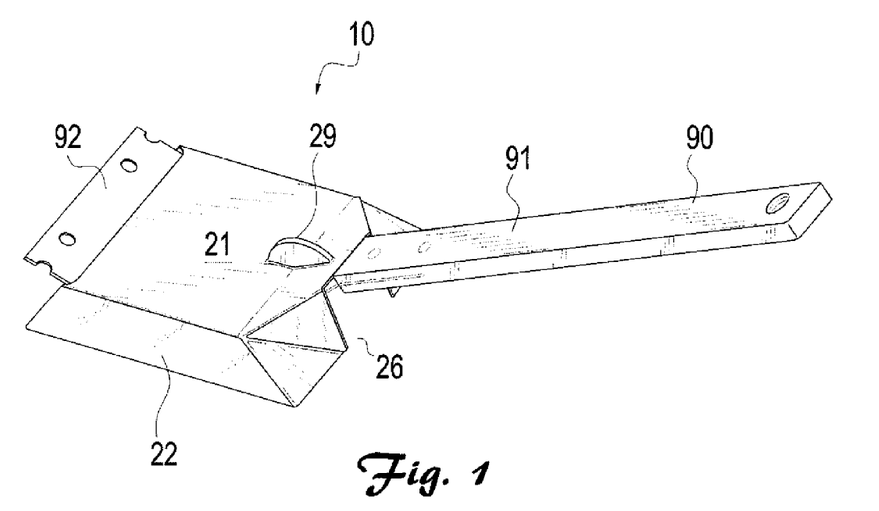
FIG. 1 is an elevated perspective view of a first preferred embodiment of the present invention configured to a barbecue cleaning brush.
Figure 7:
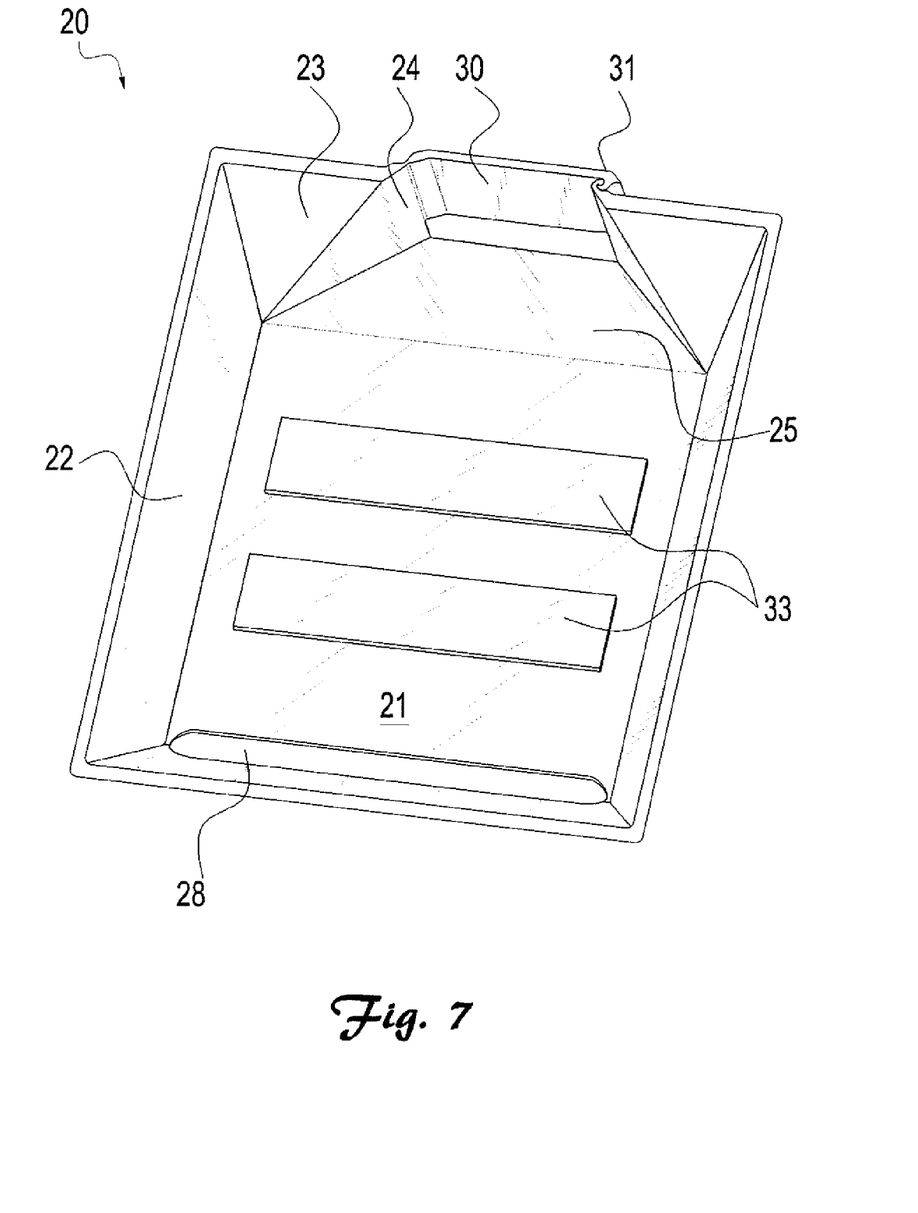
FIG. 7 is a bottom view of the first preferred embodiment with the brush tool removed.

With reference initially to FIG. 1, a grill cleaning tool (brush) splatter guard 10, 20 of the present invention is configured over an existing brush 90. At the distal (front) end, the invention 10 has a slot 28 (as also shown in FIG. 7) to accommodate a scraper portion 92 of the BBQ brush through said slot 28. The splatter guard 20 has a main portion 21 covering a top of the brush portion 93 of the grill tool 90. A lateral guard 22 provides lateral splatter protection while a rear opening 26 is necessary to assist coupling and uncoupling of the brush tool 90 to the splatter guard 20. In one embodiment, the coupling is accomplished with permanent magnets 33 on an underside of the main portion 21 with corresponding ferromagnetic material. In another embodiment, the splatter guard 20 is permanently affixed to a BBQ grill brush 90.

It is additionally contemplated that the splatter guard 20 is comprised of opaque material. As stated, the splatter guard 20 is optimally designed to eliminate grease and residue splatter when cleaning a grill that might permanently soil clothes and generally cause a mess. It should be noted that a forward guard 27 (FIG. 3), rear guard 23, 24, 30 (and 40 alternative embodiment shown in FIG. 6A) are providing protection in multiple directions.

Figure 2:
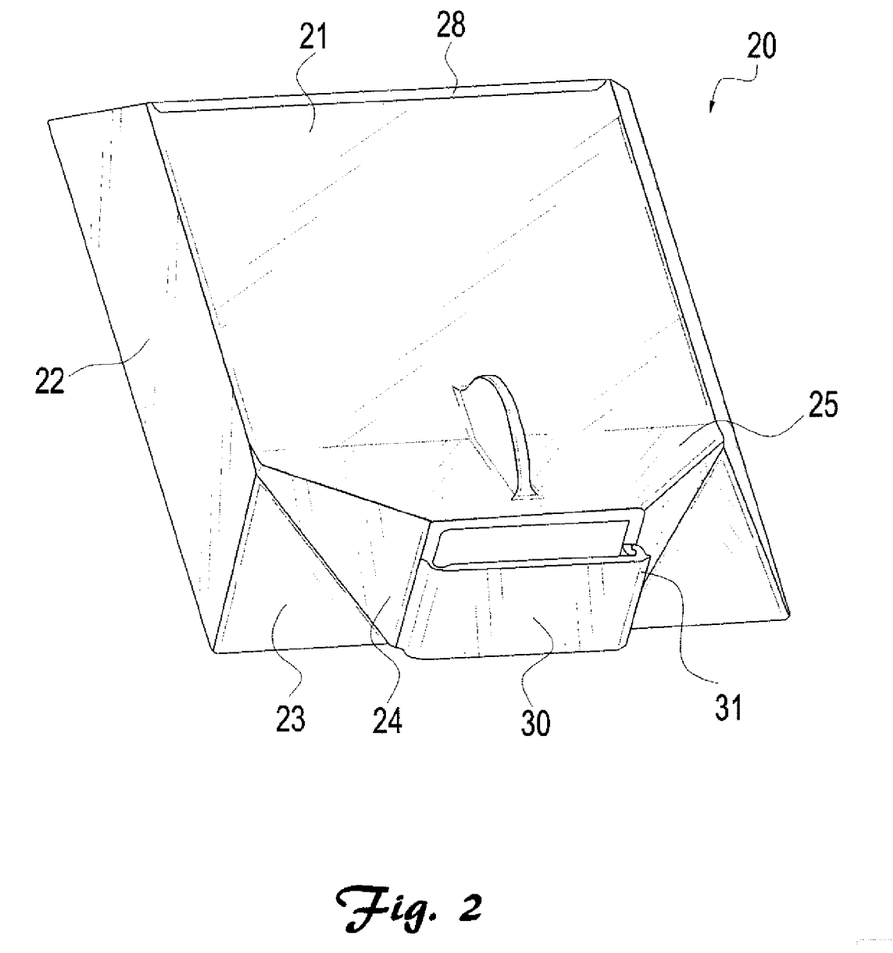
FIG. 2 is an additional perspective view the first preferred embodiment with the cleaning brush removed and with an addition of a rear guard.

With regard to FIG. 2, the main cover portion has a forward and rear end, wherein the rear end has a raised hood 25 forming the rear opening 26. A raised tab 29 for grasping and positioning the improved splatter guard 20 is additionally provided. Close inspection reveals that the tab 29 has a pie wedge shape and is affixed to both the splatter guard 20 main portion 21 and raised hood main portion 25. Also, the tab 29 has an angle 99 with respect to the raised hood 25 that also corresponds to an angle that the brush 90 handle 91 is affixed to the brush portion 93. Similarly, the raised hood 25 has a riser portion 24 with a similar angle 99. Angular relationships 99 are also clearly shown in a profile view by FIG. 4.

Also regarding FIG. 1 and FIG. 2 together, the hood riser portion 24 has a triangular shape cooperating with the trapezoidal shape of the hood main portion 25 to ergonomically configure to a grill brush 90. Additionally, the guard main portion 21 together with the lateral guard 22 form a frustum of a pyramid being hollow for covering the brush portion 93.

Additionally as seen in FIG. 2, the rear opening 26 a rear guard 30 is further configured to the rear opening 26 providing splatter protection in a reverse cleaning direction while continuing to allow the brush handle portion 91 therethrough. In a preferred embodiment a hinge 31 is provided to pivotally allow the rear guard 30 to open for removal and passage of the brush handle portion 91. In yet another preferred embodiment, the splatter guard 20 is comprised of heat resistant plastic, realized by injection molding; and further said hinge 31 can therefore be a living hinge 31 having relatively thin plastic flanked by relatively thicker plastic.

Figure 3:
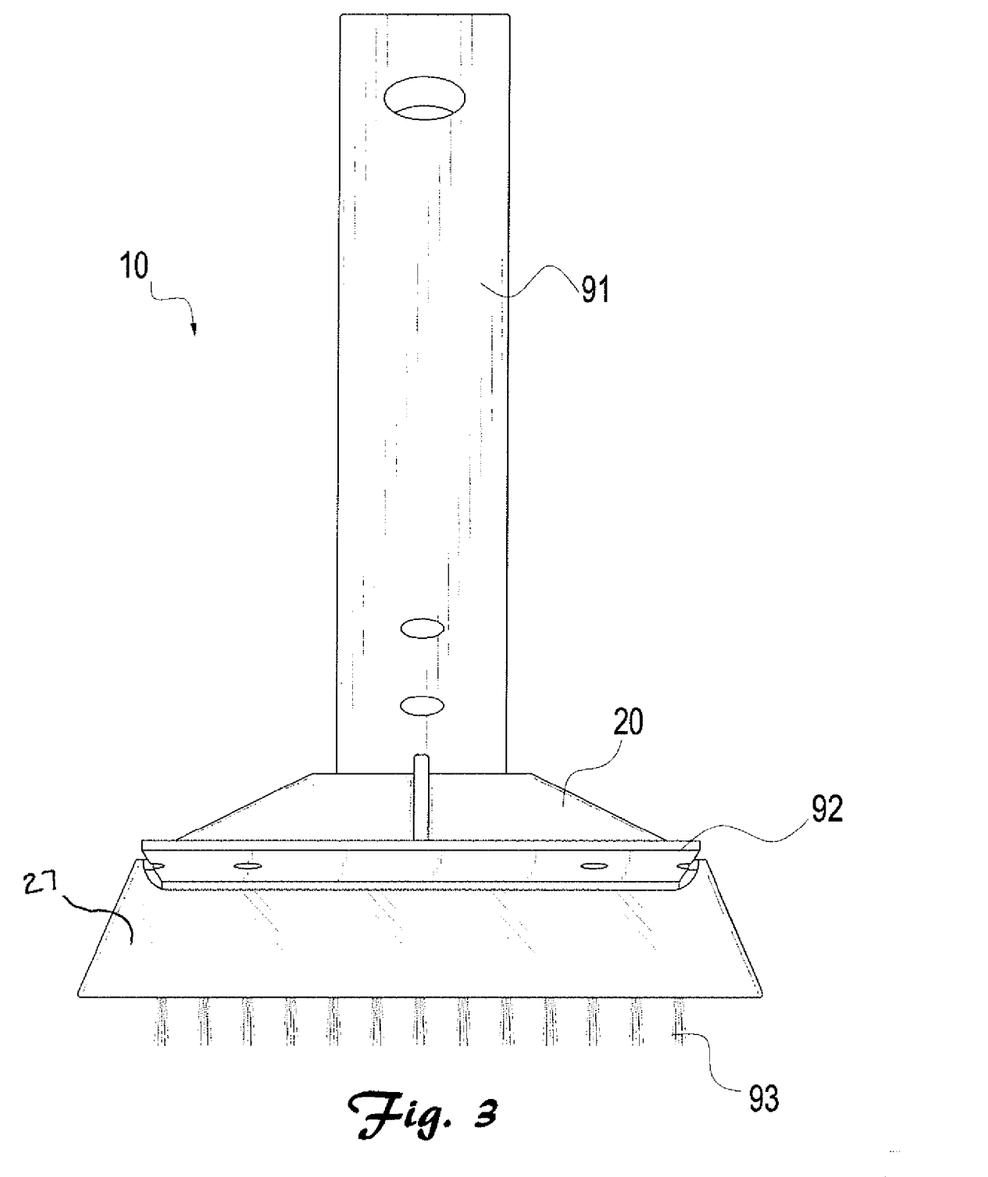
FIG. 3 is a front view thereof.
Figure 4:
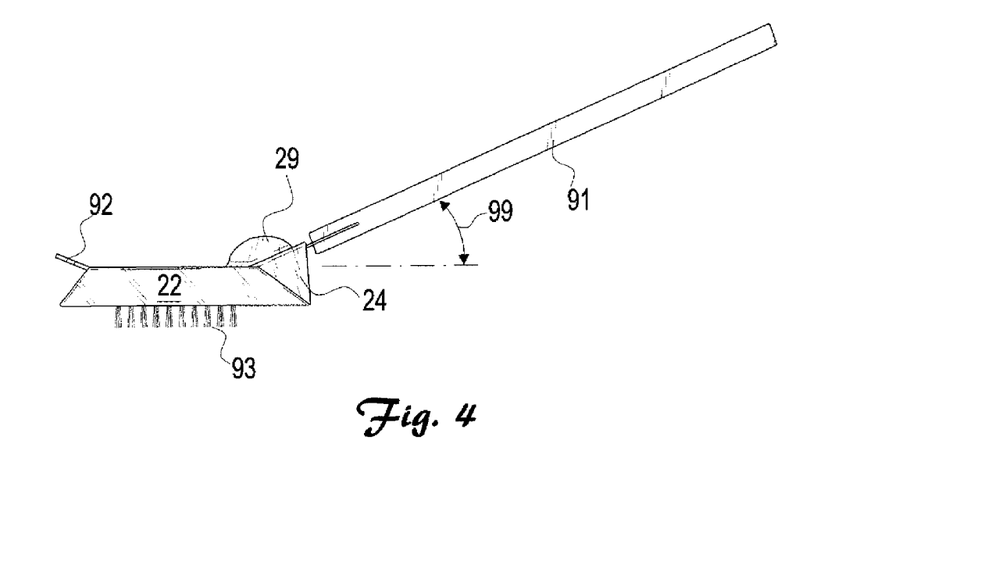
FIG. 4 is a profile view thereof.
Figure 5A:
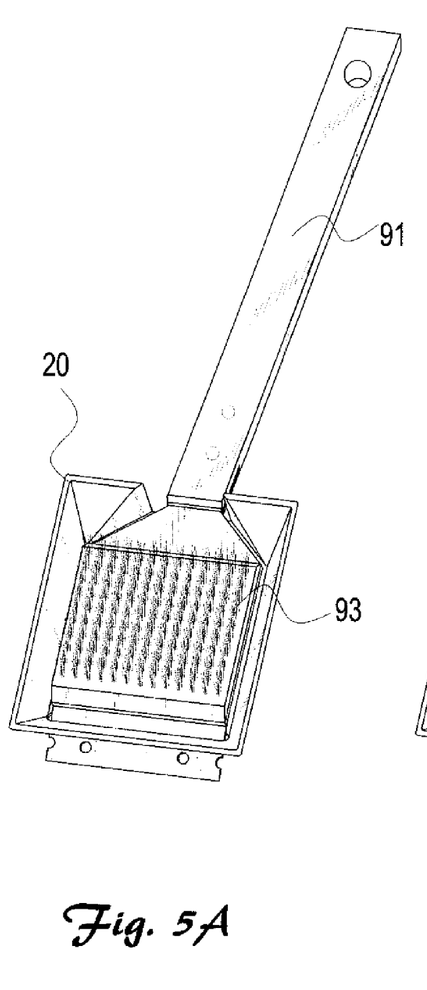
FIG. 5A is a bottom view of the first preferred embodiment.
Figure 5B:
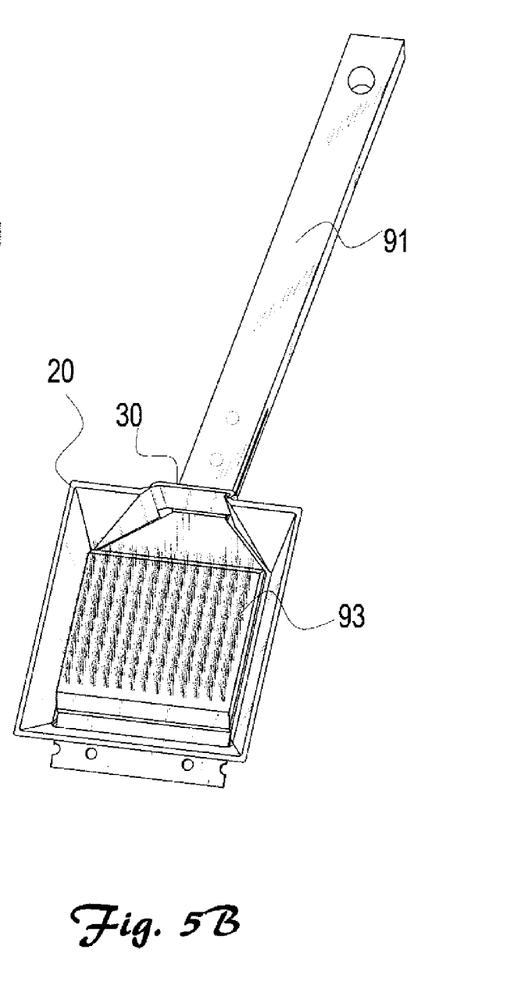
FIG. 5B is an additional bottom view with the rear guard embodiment.

FIG. 3 provides an additional view from a front of the preferred device 10. In this illustration, the forward guard 27 is most clearly visible. FIG. 4 provides a profile view most clearly showing angular 99 relationships between elements 24, 29, and 91. FIG. 5A and FIG. 5B provides perspective views from an underneath vantage point showing the first rear guard 30 embodiment.

Figure 6A:
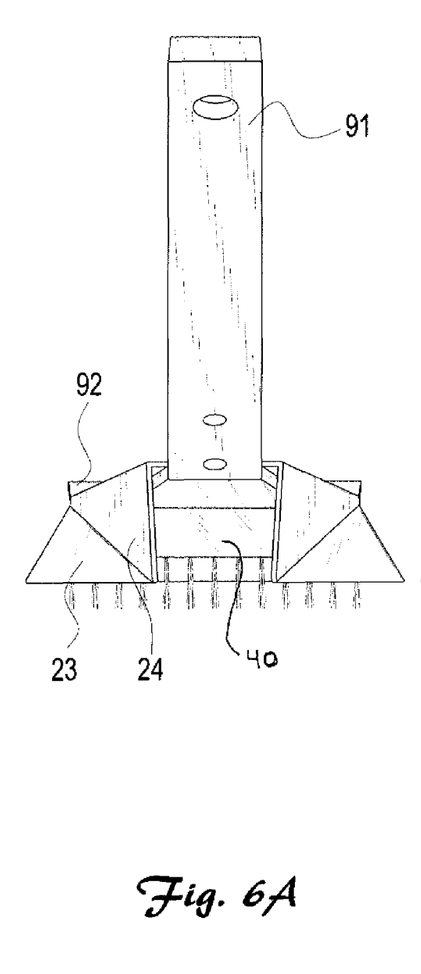
FIG. 6A is a rear view of the first preferred embodiment.
Figure 6B:
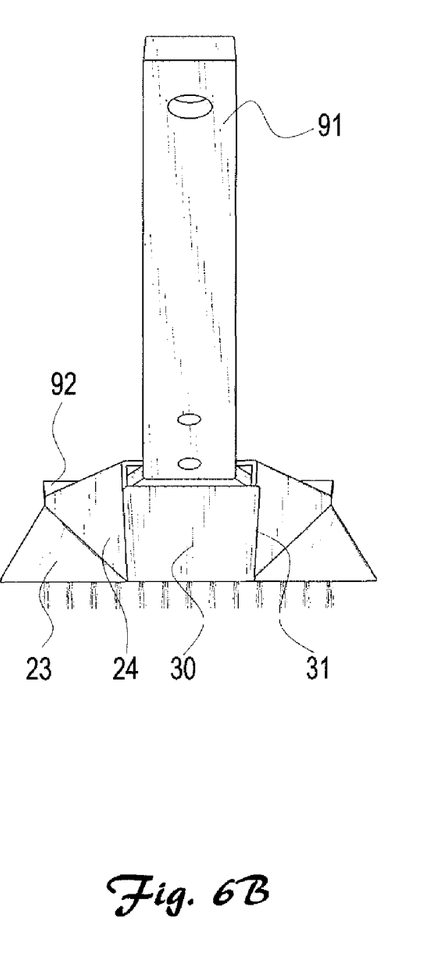
FIG. 6B is an additional rear view with the rear guard embodiment.
Figure 8:
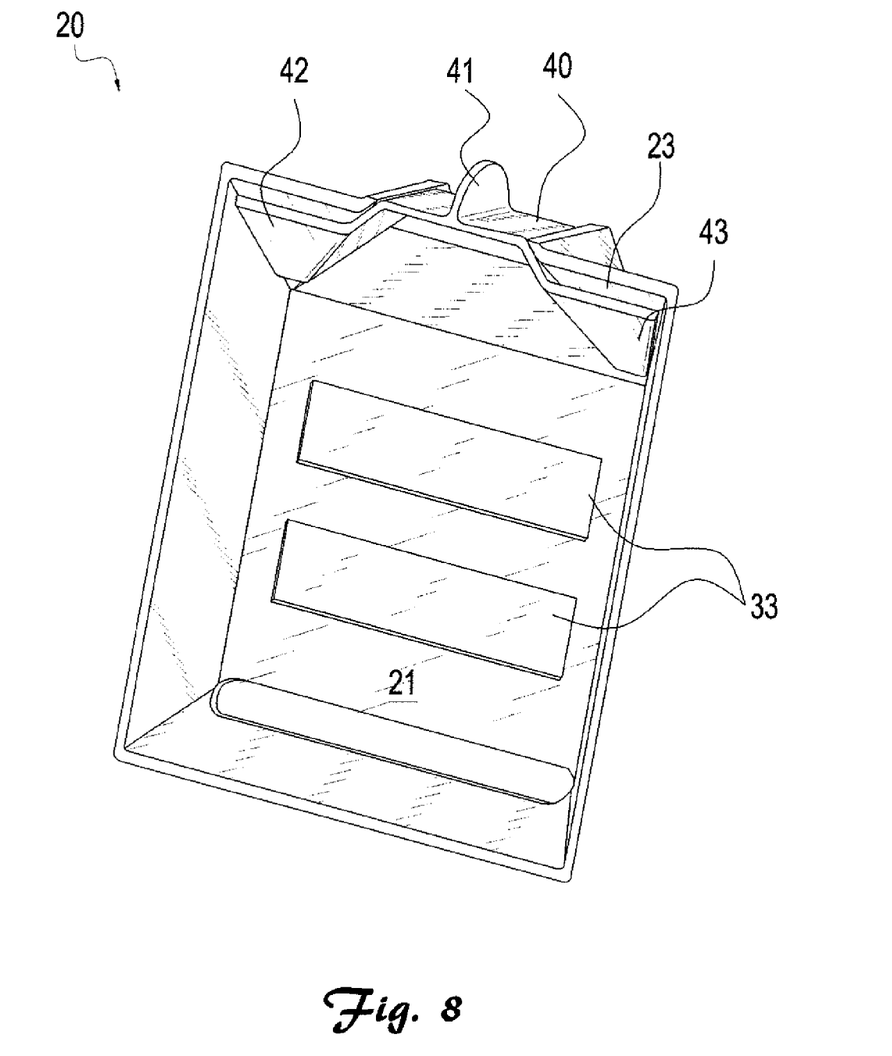
FIG. 8 is an additional bottom view with yet another rear guard embodiment.

FIG. 6A and FIG. 6B illustrate a second preferred rear guard 40 embodiment next to the first 30. Similarly, FIG. 7 provides a perspective view of first rear guard 30 with hinge 31. While FIG. 8 provides a similar view of the second preferred rear guard. Therein, the improved splatter guard 20 rear guard 40 includes first 42 and second flaps 43 for securing to an inside of the rear main portion 23; and a tab 41 for assisting removal and passage of the brush handle portion 91.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular BBQ Grill Brush Splatter Guard as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An improved splatter guard configured to be coupled to a grill brush, the grill brush having a brush portion, a handle portion and a scraper portion, the splatter guard comprising:
 a main cover portion having a forward and a rear end, the rear end having a raised hood forming an opening, the opening for passing the handle portion therethrough; and
 a raised tab for grasping and positioning the improved splatter guard, and wherein the raised hood further comprising:
 a riser portion, the riser portion being triangular in shape and providing an angle to the handle portion substantially equal an angle of the handle portion as coupled to the brush portion; and
 a raised hood main portion at said angle to the handle portion, the raised hood being trapezoidal in shape as to ergonomically fit the brush handle portion.

2. The improved splatter guard configured to be coupled to the grill brush of claim 1, the main cover portion further comprising a hollow shape further being a frustum of a pyramid for covering the brush portion.

3. The improved splatter guard configured to be coupled to the grill brush of claim 1, the raised tab further comprising:
 a pie wedged shape affixed to both the splatter guard main portion and the raised hood main portion; and
 an angle substantially equal to said angle to the handle portion.

4. The improved splatter guard configured to be coupled to the grill brush of claim 1, further comprising a slot at the main portion forward end.

5. The improved splatter guard configured to be coupled to the grill brush of claim 1, the rear end having a riser portion forming the opening further comprising a rear guard providing splatter protection in a reverse cleaning direction while continuing to allow the brush handle portion therethrough.

6. The improved splatter guard configured to be coupled to the grill brush of claim 5, the rear guard further comprising a hinge to allow the rear guard to open for removal and passage of the brush handle portion.

7. The improved splatter guard configured to be coupled to the grill brush of claim 5, the rear guard further comprising a living hinge to allow the rear guard to open for removal and passage of the brush handle portion.

8. The improved splatter guard configured to be coupled to the grill brush of claim 5, the rear guard further comprising:

first and second flaps for securing to an inside of a rear main portion; and a tab for assisting removal and passage of the brush handle portion.

9. An improved splatter guard configured to be coupled to a culinary grill brush, the grill brush having a brush portion, a handle portion having an angle with respect to the brush portion, and a scraper portion, the splatter guard comprising:

a main cover portion having a forward and a rear end; and a slot at the main cover portion forward end, the main cover portion further comprising;

a hollow shape further being a frustum of a pyramid at the main portion for covering the brush portion wherein, the rear end has a raised hood forming an opening, the opening for passing the handle portion therethrough; and a raised tab portion for grasping the splatter guard, wherein the raised hood further comprises a raised hood main portion, wherein the raised tab portion further comprising:

a pie wedged shape affixed to both the splatter guard main cover portion and the raised hood main portion; and an angle substantially equal to said handle portion having an angle with respect to the brush portion.

10. The improved splatter guard configured to be coupled to a culinary grill brush of claim 9, the raised hood further comprising:

a riser portion, the riser portion being triangular in shape and providing an angle to the handle portion substantially equal an angle of the handle portion as coupled to the brush portion; and wherein the raised hood main portion is trapezoidal in shape as to ergonomically fit the brush handle portion.

11. An improved splatter guard configured to be coupled to a grill brush, the grill brush having a brush portion, a handle portion and a scraper portion, the splatter guard comprising:

a main cover portion having a forward and a rear end, the rear end having a raised hood forming an opening, the opening for passing the handle portion therethrough; and a raised tab for grasping and positioning the improved splatter guard, wherein the rear end having a riser portion forming the opening further comprising a rear guard providing splatter protection in a reverse cleaning direction while continuing to allow the brush handle portion therethrough, wherein further the rear guard further comprising a hinge to allow the rear guard to open for removal and passage of the brush handle portion.

12. The improved splatter guard configured to be coupled to the grill brush of claim 11, the rear guard further comprising a living hinge to allow the rear guard to open for removal and passage of the brush handle portion.

13. The improved splatter guard configured to be coupled to the grill brush of claim 11, the rear guard further comprising:

first and second flaps for securing to an inside of the rear main portion; and a tab for assisting removal and passage of the brush handle portion.

* * * * *